United States Patent
Clark et al.

(10) Patent No.: US 11,085,332 B2
(45) Date of Patent: Aug. 10, 2021

(54) BOAS RETENTION ASSEMBLY WITH INTERLOCKING RING STRUCTURES

(71) Applicant: UNITED TECHNOLOGIES CORPORATION, Farmington, CT (US)

(72) Inventors: Thomas E. Clark, Sanford, ME (US); Dean W. Johnson, Springvale, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 273 days.

(21) Appl. No.: 16/249,303

(22) Filed: Jan. 16, 2019

(65) Prior Publication Data

US 2020/0224555 A1 Jul. 16, 2020

(51) Int. Cl.
| | |
|---|---|
| *F01D 25/28* | (2006.01) |
| *F01D 11/08* | (2006.01) |
| *F01D 9/04* | (2006.01) |
| *F01D 25/24* | (2006.01) |
| *F02K 3/04* | (2006.01) |

(52) U.S. Cl.
CPC .............. *F01D 25/28* (2013.01); *F01D 9/04* (2013.01); *F01D 11/08* (2013.01); *F01D 25/246* (2013.01); *F02K 3/04* (2013.01); *F05D 2220/32* (2013.01); *F05D 2220/3212* (2013.01); *F05D 2240/55* (2013.01); *F05D 2260/30* (2013.01)

(58) Field of Classification Search
CPC ........ F01D 25/246; F01D 11/08; F01D 25/28; F16B 5/0004; F16B 5/0008; F16B 5/0012; F16B 5/0084; F16B 5/121; F16B 5/126
See application file for complete search history.

(56) References Cited

U.S. PATENT DOCUMENTS

| | | | | |
|---|---|---|---|---|
| 4,247,248 | A * | 1/1981 | Chaplin | .................. F01D 11/24 415/136 |
| 6,048,170 | A | 4/2000 | Dodd | |
| 9,903,229 | B2 * | 2/2018 | Benson | .................. F01D 25/243 |
| 9,915,153 | B2 * | 3/2018 | Sener | .................. F01D 25/246 |
| 9,957,841 | B2 * | 5/2018 | Gendraud | .................. F01D 9/04 |
| 9,988,922 | B2 * | 6/2018 | Friis | .................. F01D 11/08 |
| 10,030,541 | B2 * | 7/2018 | Vetters | .................. F01D 25/246 |
| 10,053,999 | B2 | 8/2018 | McCaffrey et al. | |
| 10,472,989 | B2 * | 11/2019 | Stapleton | .............. F01D 25/246 |
| 10,605,120 | B2 * | 3/2020 | Quennehen | ............. F01D 25/12 |

(Continued)

FOREIGN PATENT DOCUMENTS

| | | |
|---|---|---|
| EP | 3219922 | 9/2017 |
| GB | 2136508 | 9/1984 |
| WO | 2015108658 | 7/2015 |

OTHER PUBLICATIONS

European Patent Office, European Search Report dated May 13, 2020 in Application No. 20151536.8.

*Primary Examiner* — David E Sosnowski
*Assistant Examiner* — Wesley Le Fisher
(74) *Attorney, Agent, or Firm* — Snell & Wilmer L.L.P.

(57) ABSTRACT

A blade outer air seal retention assembly may comprise a forward retention ring and an aft retention ring coupled to the forward retention ring. The forward retention ring may comprise a first shiplap flange extending aft from the forward retention ring. The aft retention ring may comprise a second shiplap flange extending forward from the aft retention ring.

15 Claims, 6 Drawing Sheets

(56) References Cited

U.S. PATENT DOCUMENTS

2013/0156556 A1 6/2013 Franks et al.
2016/0333703 A1* 11/2016 Sener ................. F01D 5/225
2016/0341061 A1* 11/2016 Miller ................ F01D 25/28

* cited by examiner

BOAS RETENTION ASSEMBLY WITH INTERLOCKING RING STRUCTURES

FIELD

The present disclosure relates to gas turbine engines and, more specifically, to a blade outer air seal (BOAS) retention assembly with interlocking ring structures.

BACKGROUND

A gas turbine engine generally includes a fan section, a compressor section, a combustor section, and a turbine section. The fan section drives air along a bypass flow path and a core flow path. In general, during operation, air is pressurized in the compressor section and then mixed with fuel and ignited in the combustor section to generate combustion gases. The combustion gases flow through the turbine section, which extracts energy from the combustion gases to power the compressor section and generate thrust.

The fan section, compressor section, and/or the turbine section may each include rotatable blade assemblies and non-rotating vane assemblies. A blade outer air seal (BOAS) may positioned radially outward of the outermost tips of the rotatable blades. The BOAS may be formed from ceramic matrix composite (CMC). A BOAS support structure may be employed to couple or otherwise secure the CMC BOAS to an engine casing. For example, the CMC BOAS may comprise a hook or rail configured to engage a support hook of the BOAS support structure. Metallic and/or cantilevered support hooks are at risk of excessive deflection when mated to a CMC structure (e.g., a CMC BOAS). Deflection or changes in shape may increase corner stresses, which can lead to delamination of the CMC BOAS.

SUMMARY

A retention ring for a BOAS retention assembly is disclosed herein. In accordance with various embodiments, the retention ring may comprise a radially extending wall, an axially extending rail located an outer circumference of the radially extending wall, and a first shiplap flange extending axially from a surface of the radially extending wall.

In various embodiments, the first shiplap flange may comprise a first protrusion located at a radially outward surface of the first shiplap flange, and a second protrusion located at a radially inward surface of the first shiplap flange. In various embodiments, the first protrusion may be located at a first circumferential end of the first shiplap flange, and the second protrusion may be located at a second circumferential end of the first shiplap flange opposite the first circumferential end.

In various embodiments, the first shiplap flange may comprise a first surface and a recessed surface located radially inward of the first surface. The first surface may be located a first axial length from the surface of the radially extending wall. The recessed surface may be located a second axial length from the surface of the radially extending wall. The second axial length may be less than the first axial length. In various embodiments, a circumferential distance between the first protrusion and the second protrusion may be equal to a circumferential length of the recessed surface.

In various embodiments, the retention ring may comprise a plurality of circumferentially spaced shiplap flanges, the plurality of circumferentially spaced shiplap flanges including the first shiplap flange. In various embodiments, the radially extending wall may extend continuously about a center axis of the retention ring.

A BOAS retention assembly is also disclosed herein. In accordance with various embodiments, the BOAS retention assembly may comprise a forward retention ring and an aft retention ring coupled to the forward retention ring. The forward retention ring may comprise a first wall and a first shiplap flange extending aft from a first surface of the first wall. The aft retention ring may comprise a second wall and a second shiplap flange extending forward from a second surface of the second wall.

In various embodiments, the first shiplap flange may comprise a first radially outward protrusion and a first radially inward protrusion. The second shiplap flange may comprise a second radially outward protrusion and a second radially inward protrusion. The first radially outward protrusion of the first shiplap flange may engage the second radially inward protrusion of the second shiplap flange, and the first radially inward protrusion of the first shiplap flange may engage the second radially outward protrusion of the second shiplap flange.

In various embodiments, the first shiplap flange and the second shiplap flange may define a ring orifice. In various embodiments, a first axial width of the ring orifice may be greater than a second axial width of the ring orifice. The first axial width may extend from a first recessed surface of the first shiplap flange to a second recessed surface of the second shiplap flange. The second axial width may extend from an aft-facing first surface of the first shiplap flange to a forward-facing first surface of the second shiplap flange.

A turbine section of a gas turbine engine is also disclosed herein. In accordance with various embodiments, the turbine section may comprise a BOAS comprising a first BOAS segment, and a BOAS retention assembly coupled to the BOAS. The BOAS retention assembly may comprise a forward retention ring and an aft retention ring coupled to the forward retention ring. The forward retention ring may include a first shiplap flange extending aft from a radially extending wall of the forward retention ring. The aft retention ring may include a second shiplap flange extending forward from a radially extending wall of the aft retention ring. The first shiplap flange and the second shiplap flange may be located in a retention ring channel defined by the first BOAS segment.

In various embodiments, the BOAS may comprise a plurality of BOAS segments arranged in circumferential series around an engine central longitudinal axis, the plurality of BOAS segments including the first BOAS segment. The forward retention ring may comprise a plurality of forward ring shiplap flanges extending aft from the radially extending wall of the forward retention ring, the plurality of forward ring shiplap flanges including the first shiplap flange. At least one forward ring shiplap flange of the plurality of forward ring shiplap flanges may be located within each BOAS segment of the plurality of BOAS segments.

In various embodiments, a turbine case structure may be located radially outward of the BOAS and the BOAS retention assembly. The BOAS retention assembly may couple the BOAS to the turbine case structure. In various embodiments, the first BOAS segment may comprise a radially outward portion and a radially inward portion. The retention ring channel may be defined by the radially outward portion and the radially inward portion of the first BOAS segment.

In various embodiments, turbine case may comprise a central flange, and the central flange may be located through a case orifice defined by the radially outward portion of the first BOAS segment. In various embodiments, the first shiplap flange and the second shiplap flange may define a ring orifice, and the central flange may be located in the ring orifice.

In various embodiments, the central flange may define a groove, and a first portion of the first shiplap flange and a second portion of the second shiplap flange may be located in the groove.

In various embodiments, the first shiplap flange may comprise a first radially outward protrusion and a first radially inward protrusion, and the second shiplap flange may comprise a second radially outward protrusion and a second radially inward protrusion. The first radially outward protrusion of the first shiplap flange may engage the second radially inward protrusion of the second shiplap flange. The first radially inward protrusion of the first shiplap flange may engage the second radially outward protrusion of the second shiplap flange.

In various embodiments, the central flange may be located circumferentially between the first radially outward protrusion and the second radially outward protrusion and circumferentially between the first radially inward protrusion and the second radially inward protrusion.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
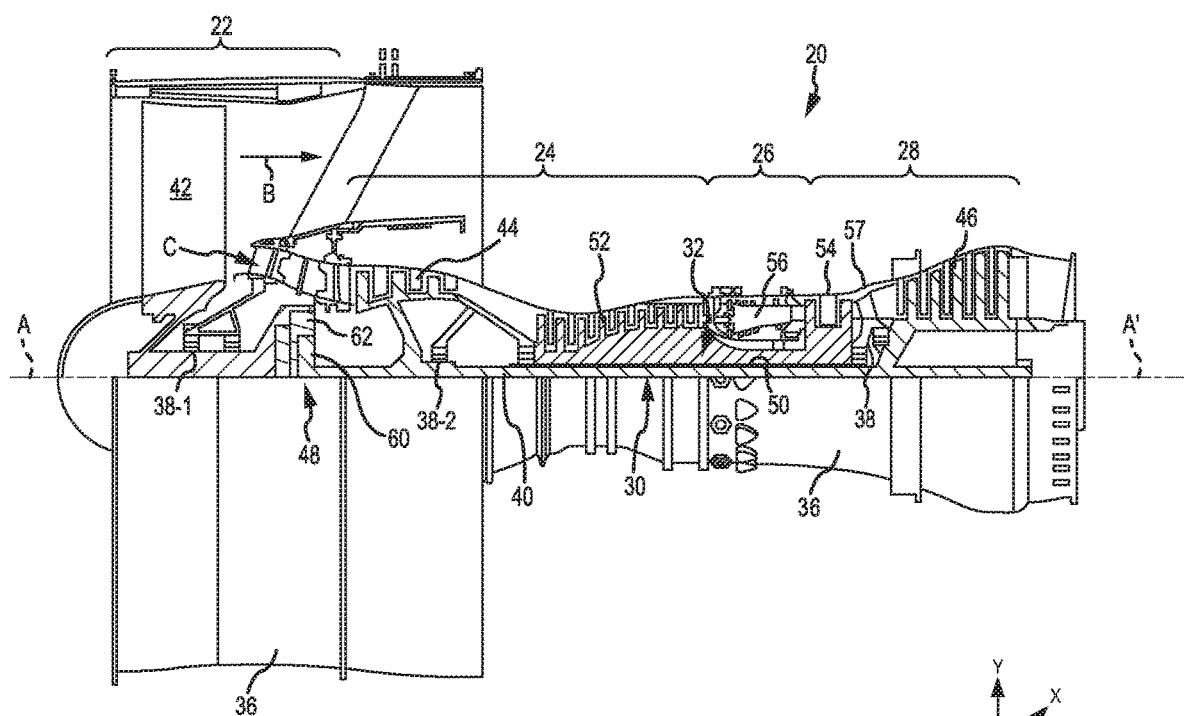
FIG. 1 illustrates a cross-sectional view of an exemplary gas turbine engine, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

A first component that is "radially outward" of a second component means that the first component is positioned at a greater distance away from a common axis (e.g., the engine central longitudinal axis) than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component.

A BOAS retention assembly configured to secure a CMC BOAS to an engine casing structure is disclosed herein. In accordance with various embodiments, the BOAS retention assembly may comprise a pair of interlocking retention rings. The retention rings may be identical and interchangeable such that either ring may be used as the forward ring or the aft ring. The retention rings comprise interlocking shiplap flanges to provide load-share between the retention rings. The shiplap flanges may define an opening configured to receive a portion of the engine casing structure. Locating the portion of the engine casing structure in the shiplap flanges may prevent or reduce rotation of the BOAS retention assembly. BOAS retention assemblies, as disclosed herein, may reduce or limit deflection of the CMC BOAS.

With reference to FIG. 1, an exemplary gas turbine engine 20 is provided, in accordance with various embodiments.

Gas turbine engine 20 may be a two-spool turbofan that generally incorporates a fan section 22, a compressor section 24, a combustor section 26, and a turbine section 28. In operation, fan section 22 drives fluid (e.g., air) along a bypass flow-path B, while compressor section 24 drives fluid along a core flow-path C for compression and communication into combustor section 26 and then expansion through turbine section 28. Although gas turbine engine 20 is depicted as a turbofan gas turbine engine herein, it should be understood that the concepts described herein are not limited to use with turbofans as the teachings may be applied to other types of turbine engines.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. It should be understood that various bearing systems 38 at various locations may alternatively or additionally be provided, including for example, bearing system 38, bearing system 38-1, and bearing system 38-2. Engine central longitudinal axis A-A' is oriented in the z direction on the provided xyz axes. The z direction on the provided xyz axes refers to the axial direction. As used herein, the terms "radial" and "radially" refer to directions towards and away from central longitudinal axis A-A' and the z-axis. As used herein, the terms "circumferential" and "circumferentially" refer to directions about central longitudinal axis A-A' and the z-axis.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 and high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion. Fan section 22, compressor section 24, and/or turbine section 28 may each include one or more stages or sets of blades assemblies configured to rotate about engine central longitudinal axis A-A' and one or more stages or sets of stationary vanes axially interspersed with the blade assemblies but non-rotating about engine central longitudinal axis A-A'.

Figure 2:
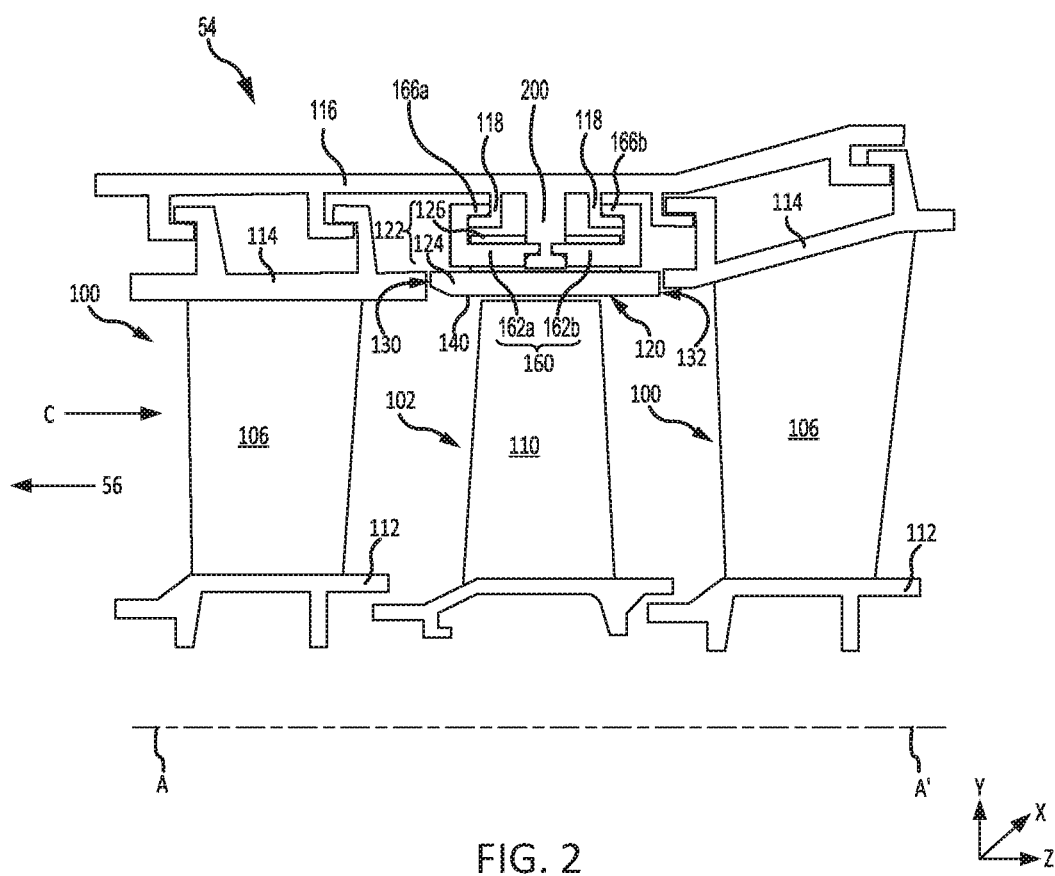
FIG. 2 illustrates a schematic cross-section of a portion of a high pressure turbine section of the gas turbine engine of FIG. 1, in accordance with various embodiments.

Referring to FIG. 2, and with continued reference to FIG. 1, a portion of high pressure turbine 54 is illustrated, in accordance with various embodiments. High pressure turbine 54 may include non-rotating vane assemblies 100 and rotating blade assemblies 102 (one shown) axially interspersed with vane assemblies 100. Vane assemblies 100 each include a plurality of vanes 106 positioned about engine central longitudinal axis A-A'. Each vane 106 may extend between an inner vane platform 112 and an outer vane platform 114. Outer vane platform 114 may be configured to couple or otherwise attach vane assembly 100 to a turbine case structure 116. Turbine case structure 116 may form a portion of engine static structure 36, in FIG. 1. Vane assemblies 100 comprise static structures that do not rotate relative to engine central longitudinal axis A-A'. Vane assemblies 100 may help direct the flow of fluid (e.g., airflow along core flow path C) to and from blade assemblies 102.

Blade assembly 102 includes a plurality of blades 110 configured for rotation about engine central longitudinal axis A-A'. For example, blades 110 may rotate in response to receiving a flow of fluid (e.g., combustion gases) from combustor 56. Power from the flow may be converted to mechanical power, or torque, by blades 110. Blade assembly 102 includes BOAS 120. BOAS 120 is disposed radially outward of blades 110. BOAS 120 is configured to provide a seal and reduce or prevent hot gases from leaking outside the core flow path C. In various embodiments, BOAS 120 may be segmented. For example, BOAS 120 may comprise a plurality of arcuate BOAS segments 122, arranged in circumferential series around engine central longitudinal axis A-A'.

Figure 3:
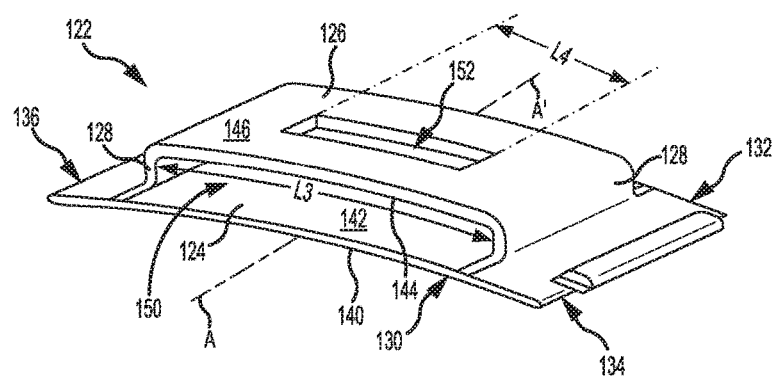
FIG. 3 illustrates a BOAS segment configured to be supported by interlocking rings of a BOAS retention assembly, in accordance with various embodiments.

With reference to FIG. 3, a BOAS segment 122 of BOAS 120 is illustrated, in accordance with various embodiments. BOAS segment 122 may be formed of CMC. For example, BOAS segment 122 may formed from textile layers (or plies) comprising woven, braided, knitted, and/or 3D printed fibers (e.g., SiC fibers, carbon fibers, etc.). A ceramic matrix may be formed around the fibers. The ceramic matrix may be formed using chemical vapor infiltration or deposition ("CVI/CVD").

In accordance with various embodiments, BOAS segment 122 includes a radially inward (or first) portion 124 and a radially outward (or second) portion 126. When installed in blade assembly 102, with momentary reference to FIG. 2, radially inward portion 124 of BOAS segments 122 is located proximate (i.e., closer to) blades 110, as compared to radially outward portion 126 of BOAS segments 122.

Returning to FIG. 3, BOAS segment 122 includes a pair of radially extending walls 128. Walls 128 extend in a radial direction between radially outward portion 126 and radially inward portion 124. Radially inward portion 124 defines a forward edge 130, an aft edge 132, a first circumferential edge 134, and a second circumferential edge 136 of BOAS segment 122. First and second circumferential edges 134, 136 extend axially between forward edge 130 and aft edge 132. Stated differently, forward and aft edges 130, 132 extend circumferentially between first circumferential edge 134 and second circumferential edge 136. BOAS segments 122 may be arranged in circumferential series such that the first circumferential edge 134 of a first BOAS segment 122 is circumferentially adjacent to the second circumferential edge 136 of a second BOAS segment 122.

Radially inward portion 124 of BOAS segment 122 comprises a radially inward facing surface 140 and a radially outward facing surface 142. Radially outward portion 126 of BOAS segment 122 comprises a radially inward facing surface 144 and a radially outward facing surface 146. Radially inward facing surface 144 of radially outward portion 126 is oriented toward radially outward facing surface 142 of radially inward portion 124. Radially inward facing surface 144 of radially outward portion 126, radially outward facing surface 142 of radially inward portion 124, and walls 128 define a retention ring channel 150. Stated differently, BOAS segment 122 includes a retention ring channel 150 located between radially outward portion 126 and radially inward portion 124. BOAS segment 122 further includes a case orifice 152. Case orifice 152 is located through radially outward portion 126 of BOAS segment 122. Stated differently, radially outward portion 126 may define case orifice 152. Case orifice 152 extends completely through radially outward portion 126 (i.e., from radially inward facing surface 144 to radially outward facing surface 146 of radially outward portion 126).

Returning to FIG. 2, BOAS segments 122 may be coupled, or otherwise secured, to turbine case structure 116 via a BOAS retention assembly 160. BOAS retention assembly 160 includes a pair of interlocking retention rings 162 (e.g., forward retention ring 162a and aft retention rings 162b).

Figure 4:
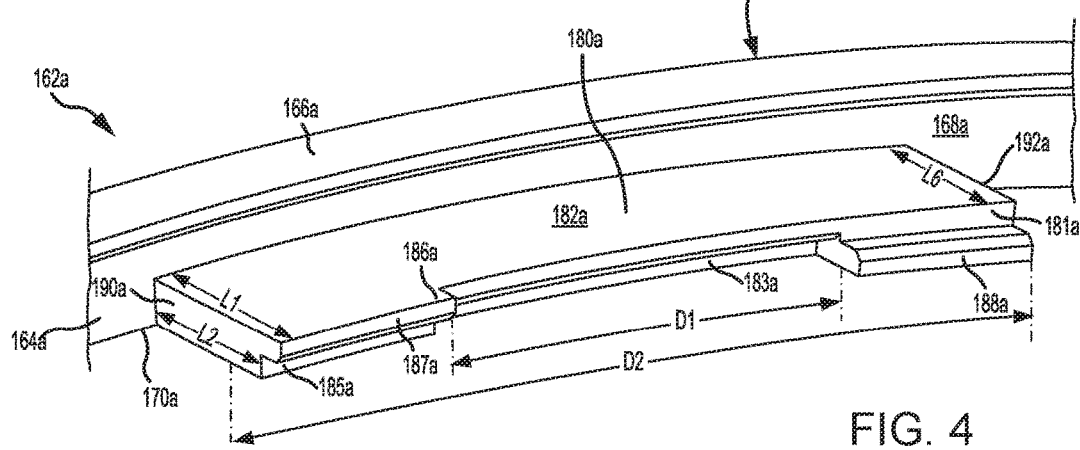
FIG. 4 illustrates a perspective view of a portion of an interlocking ring of a BOAS retention assembly, in accordance with various embodiments.

With reference to FIG. 4, a portion of forward retention ring 162a is illustrated, in accordance with various embodiments. While FIG. 4 illustrates forward retention ring 162a, it contemplated and understood that aft retention ring 162b is a mirror image of forward retention ring 162a. Forward retention ring 162a includes a radially extending wall 164a. In various embodiments, wall 164a may extend continuously (i.e., 60° without discontinuity or interruption) about a center axis of forward retention ring 162a. In various embodiments, engine central longitudinal axis A-A' forms the center axis of forward retention ring 162a. A rail 166a is located at a radially outward end of forward retention ring 162a. Stated differently, rail 166a is located generally opposite a radially inward surface 170a of forward retention ring 162a. Stated yet another way, rail 166a is located at an outer circumference of forward retention ring 162a, and radially inward surface 170a is located at an inner circumference of forward retention ring 162a. Rail 166a extends axially from a first surface 168a of wall 164a. First surface 168a is generally opposite a second surface 169a of wall 164a. Rail 166a may be configured to couple forward retention ring 162a to an engine casing structure. For example, with momentary reference to FIG. 2, rail 166a of forward retention ring 162a and rail 166b of aft retention ring 162b may each engage a casing hook 118 to secure BOAS retention assembly 160 to turbine case structure 116. In various embodiments, casing hooks 118 may extend radially inward from turbine case structure 116 and may include axially extending rails or flanges configured to engage rails 166a, 166b of BOAS retention assembly 160.

Returning to FIG. 4, in various embodiments, forward retention ring 162a may be a unibody, or monolithic, structure. In this regard, forward retention ring 162a may form a continuous 360° ring. Forward retention ring 162a may be formed from a metal or metal alloy. For example, forward retention ring 162a may comprise a cobalt-based alloy, a nickel-based super alloy, or any other metal or metal alloy.

Forward retention ring 162a includes a plurality of circumferentially spaced shiplap flanges 180a (one shown). In various embodiments, the number of shiplap flanges 180a is equal to the number of BOAS segments 122 in BOAS 120, with momentary reference to FIG. 2, such that each BOAS segment 122 receives a shiplap flange 180a. Stated differently, circumferentially adjacent shiplap flanges 180a are located in the retention ring channels 150 (FIG. 3) of circumferentially adjacent BOAS segments 122.

Shiplap flange 180a extends axially from first surface 168a of wall 164a. In various embodiments, shiplap flange 180a maybe defined by radially inward surface 170a and a radially outward surface 182a. Radially outward surface 182a is oriented away from radially inward surface 170a. Radially outward surface 182a may be spaced radially inward of rail 166a. Radially inward surface 170a and radially outward surface 182a of shiplap flange 180a extend circumferentially between a first circumferential end 190a and a second circumferential end 192a of shiplap flange 180a.

Shiplap flange 180a includes radially outward (or first) protrusion 186a and a radially inward (or second) protrusion 188a. Radially outward protrusion 186a may be located proximate radially outward surface 182a and first circumferential end 190a of shiplap flange 180a. Radially outward protrusion 186a extends axially from a first surface 181a and from a second surface 185a of shiplap flange 180a. An axial length L1 of shiplap flange 180a, as measured at first circumferential end 190a and along radially outward surface 182a, is greater than a second axial length L2 of shiplap flange 180a, as measured at first circumferential end 190a and along radially inward surface 170a. Axial length L1 extends from first surface 168a of wall 164a to surface 187a of radially outward protrusion 186a. First surface 168a of wall 164a may be generally parallel to surface 187a of radially outward protrusion 186a. Axial length L2 extends from first surface 168a of wall 164a to second surface 185a of shiplap flange 180a. First surface 168a of wall 164a may be generally parallel to second surface 185a. Second surface 185a may extend radially from radially inward surface 170a of shiplap flange 180a to radially outward protrusion 186a.

Radially inward protrusion 188a may be located proximate radially inward surface 170a and second circumferential end 192a of shiplap flange 180a. Radially inward protrusion 188a extends axially from first surface 181a shiplap flange 180a. An axial length of shiplap flange 180a, as measured at second circumferential end 192a and along radially inward surface 170a, is greater than an axial length L6 of shiplap flange 180a, as measured at second circumferential end 192a and along radially outward surface 182a. In various embodiments, the axial length of shiplap flange 180a at radially inward protrusion 188a may be equal to axial length L1 of shiplap flange 180a at radially outward protrusion 186a, and axial length L6 of shiplap flange 180a, as measured at second circumferential end 192a and along radially outward surface 182a, may be equal to axial length L2 at first circumferential end 190a. Axial length L6 extends from first surface 168a of wall 164a to first surface 181a of shiplap flange 180a. First surface 168a of wall 164a may be generally parallel to first surface 181a. Shiplap flange 180a further includes a recessed surface 183a located radially inward of first surface 181a. Recessed surface 183a may be parallel to first surface 181a and second surface 185a. An axial distance L7, with momentary reference to FIG. 7, between first surface 168a of wall 164a and recessed surface 183a is less than axial distance L2 and axial distance L6.

Radially outward protrusion 186a is located a circumferential distance D1 from radially inward protrusion 188a. Distance D1 is equal to the circumferential length of recessed surface 183a. First circumferential end 190a is located a circumferential distance D2 from second circumferential end 192a. With combined reference to FIGS. 3 and 4, the circumferential distance D2 between first circumferential end 190a and second circumferential end 192a is selected such that shiplap flange 180a may be inserted into retention ring channel 150 of BOAS segment 122. In this regard, circumferential distance D2 is approximately equal to a circumferential length L4 between walls 128 of BOAS segment 122. It is contemplated and understood that circumferential distance D2 will be slightly less than circumferential length L4 to allow shiplap flange 180a to be inserted into retention ring channel 150. Additionally, a difference between circumferential length L4 and circumferential distance D2 may selected to allow for thermal expansion of shiplap flange 180a. For example, the difference between circumferential length L4 and circumferential distance D2 may be between 0.002 inches and 0.10 inches (0.051 mm and 2.54 mm), or between 0.002 inches and 0.02 inches (0.051 mm and 0.51 mm).

Figure 5A:
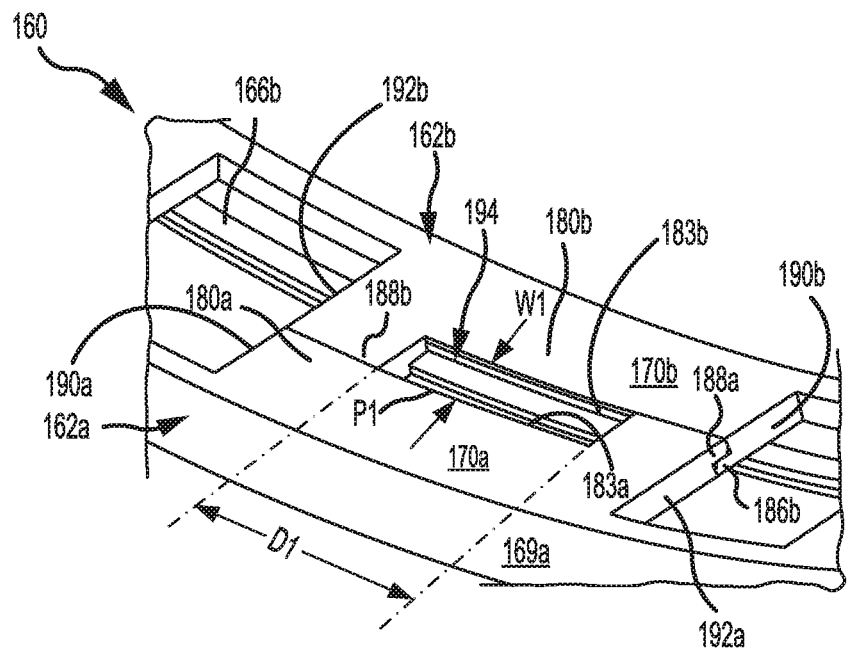
FIGS. 5A and 5B illustrate, respectively, a perspective view of the radially inward side of a BOAS retention assembly and a perspective view of the radially outward side of a BOAS retention assembly, in accordance with various embodiments.
Figure 5B:
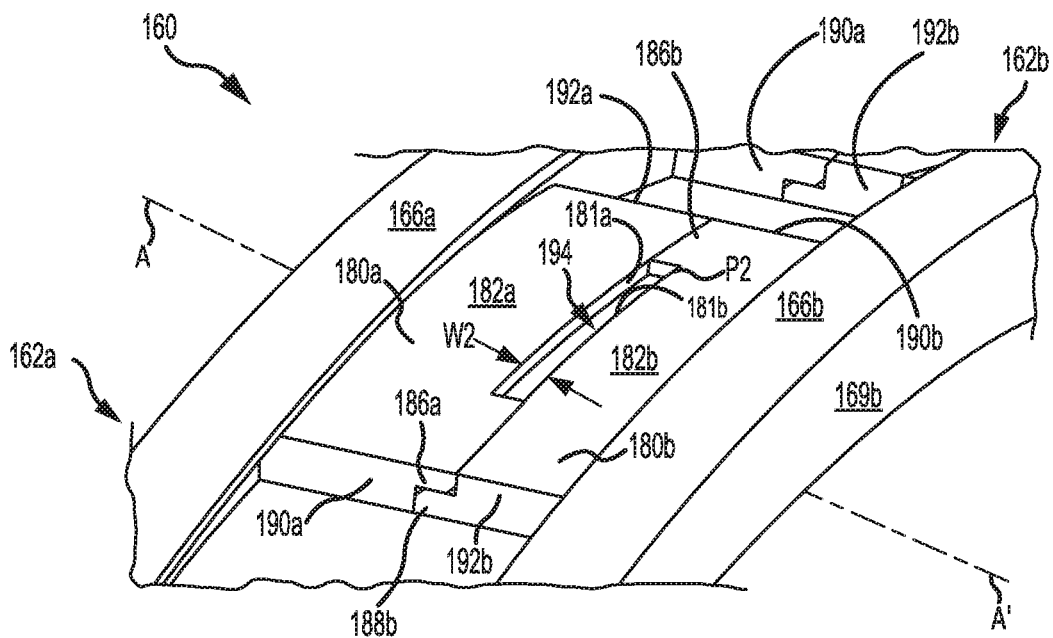

FIG. 5A shows a portion of the radially inward side of assembled BOAS retention assembly 160. FIG. 5B shows a portion of the radially outward side of assembled BOAS retention assembly 160. Forward retention ring 162a and aft retention ring 162b may be used interchangeably in BOAS retention assembly 160. In other words, two retention rings 162 having the same design are used to form BOAS retention assembly 160. The single part design may simplify the manufacturing and assembly process.

With combined reference to FIGS. 5A and 5B, BOAS retention assembly 160 is assembled by interlocking the shiplap flange 180a of forward retention ring 162a with the shiplap flange 180b of aft retention ring 162b. Radially inward protrusion 188a of forward retention ring 162a is configured to engage radially outward protrusion 186b of aft retention ring 162b. Radially inward protrusion 188b of aft retention ring 162b is configured to engage radially outward protrusion 186a of forward retention ring 162a. Shiplap flange 180a and shiplap flange 180b define a ring orifice 194. Ring orifice 194 extents completely through shiplap flanges 180a, 180b (i.e., from radially inward surfaces 170a, 170b to radially outward surfaces 182a, 182b). Radially inward surface 170a of shiplap flange 180a and radially inward surface 170b of shiplap flange 180b define a radially inward perimeter P1 of ring orifice 194. Radially outward surface 182a of shiplap flange 180a and radially outward surface 182b of shiplap flange 180b define a radially outward perimeter P2 of ring orifice 194. In various embodiments, an axial width W1 of ring orifice 194, as measured at radially inward surfaces 170a, 170b, may be greater than an axial width W2 of ring orifice 194, as measured at radially outward surfaces 182a, 182b. Axial width W2 may be measured between aft-facing recessed surface 183a of shiplap flange 180a and forward-facing recessed surface 183b of shiplap flange 180b. Axial width W1 may be measured between aft-facing first surface 181a of shiplap flange 180a and forward-facing first surface 181b of shiplap flange 180b. With combined reference to FIGS. 3, 5A, and 5B. Shiplap flanges 180a, 180b are configured such that, when forward and aft retention rings 162a, 162b are located within retention ring channel 150 of BOAS segment 122, ring orifice 194 will align with case orifice 152.

Figure 6A:
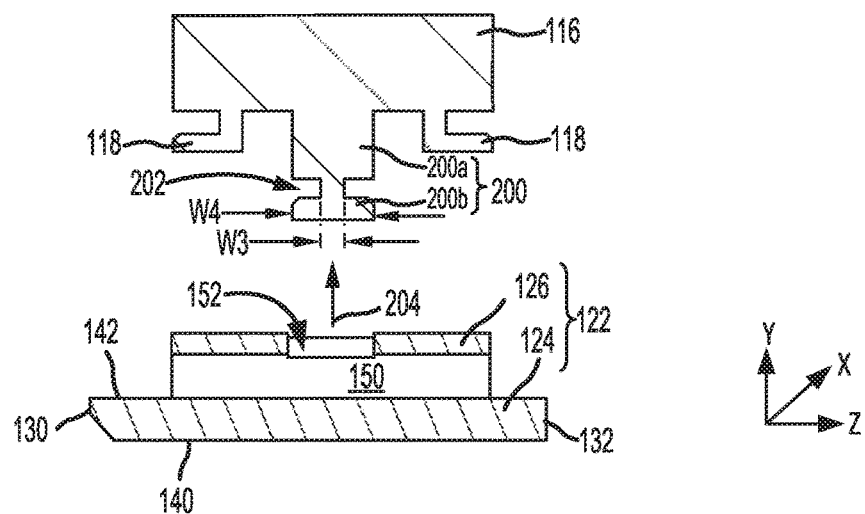
FIGS. 6A, 6B, and 6C illustrate assembly of a BOAS retention assembly to secure a BOAS to an engine case structure, in accordance with various embodiments.
Figure 6B:
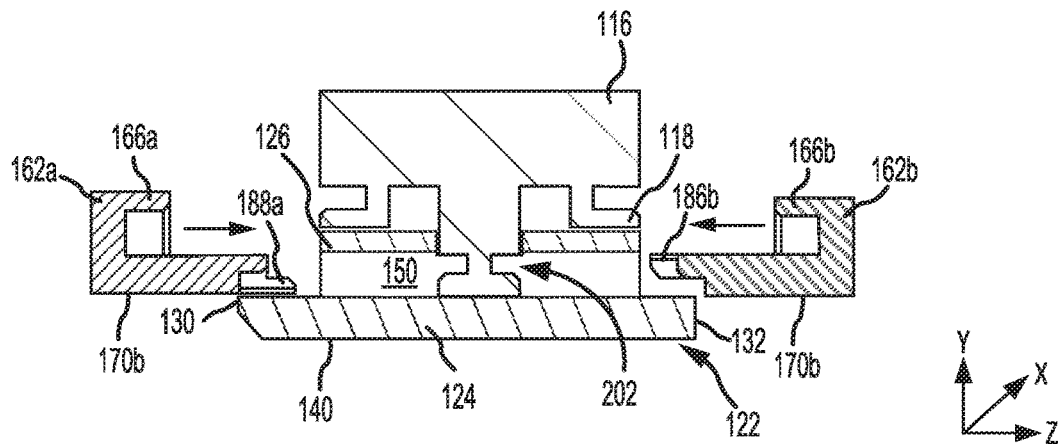
Figure 6C:
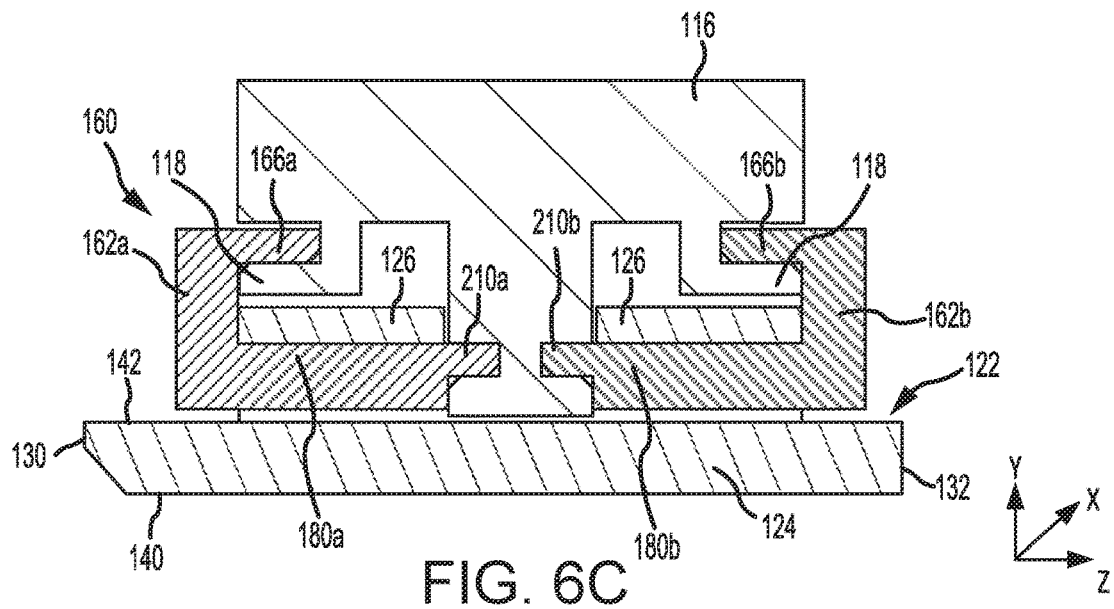

With reference to FIGS. 6A, 6B, and 6C assembling of BOAS retention assembly 160 to secure BOAS segments 122 to turbine case structure 116 is illustrated, in accordance with various embodiments. In FIG. 6A, BOAS segment 122 is translated radially (i.e., in the direction of arrow 204) to locate a central flange 200 of turbine case structure 116 through case orifice 152. Central flange 200 extends radially inward from turbine case structure 116. In various embodiments, a groove 202 may be formed in central flange 200 (i.e., central flange 200 defines groove 202). Groove 202 may separate a radially outward (or first) portion 200a of central flange 200 from a radially inward (or second) portion 200b of central flange 200. Stated differently, groove 202 is located radially in ward of portion 200a and radially outward of portion 200b. A width W3 of central flange 200, as measured at groove 202, is less than a width W4 of central flange 200, as measured at radially inward portion 200b. In various embodiments, the width of radially outward portion 200a may be equal to width W4 of radially inward portion 200b.

With combined reference to FIGS. 5B and 6A, width W3 is approximately equal to axial width W2 of ring orifice 194 at radially outward surfaces 182a, 182b. It is contemplated and understood that width W3 may be slightly less than axial width W2 to allow for thermal expansion of retention rings 162a, 162b and/or of central flange 200. For example, the difference between axial W2 and width W3 may be between 0.002 inches and 0.10 inches (0.051 mm and 2.54 mm), or between 0.002 inches and 0.02 inches (0.051 mm and 0.51 mm). The widths of radially outward portion 200a and radially inward portion 200b (e.g. width W4) are selected to be greater than axial W2, such that when BOAS retention assembly 160 is coupled to central flange 200 (FIG. 7), a portion 210a of shiplap flange 180a and a portion 210b of shiplap flange 180b will be located in groove 202. Locating portions 210a, 210b in groove 202 tends to limit or reduce deflection of retention rings 162a, 162b, which in turn may reduce deflection of and/or stress exerted on, BOAS segments 122.

With combined reference to FIGS. 5A and 6A, width W4 of central flange 200 is approximately equal to axial width W1 of ring orifice 194 at radially inward surfaces 170a, 170b. It is contemplated and understood that width W4 may be slightly less than axial width W1 to allow for thermal expansion of retention rings 162a, 162b and/or for thermal expansion of central flange 200. For example, the difference between axial W1 of ring orifice 194 and width W4 of central flange 200 may be between 0.002 inches and 0.10 inches (0.051 mm and 2.54 mm), or between 0.002 inches and 0.02 inches (0.051 mm and 0.51 mm).

With reference to FIG. 6B, after locating central flange 200 through case orifice 152 (FIG. 6A), groove 202 is located radially inward of radially outward portion 126 of BOAS segment 122. Forward retention ring 162a is translated aft into retention ring channel 150, and aft retention ring 162b is translated forward into retention ring channel 150, until radially inward protrusion 188a of forward retention ring 162a engages radially outward protrusion 186b of aft retention ring 162b and radially inward flange 188b (FIG. 5B) of aft retention ring 162b engages radially outward protrusion 186a (FIG. 5B) of forward retention ring 162a).

With reference to FIG. 6C, BOAS retention assembly 160 is shown after interlocking forward retention ring 162a with aft retention ring 162b. Casing hooks 118 receive and engage rails 166a and 166b, and portions 210a, 210b of shiplap flanges 180a, 180b are located in groove 202 to couple of otherwise secure BOAS retention assembly to turbine case structure 116. Shiplap flanges 180a, 180b are located between radially inward portion 124 and radially outward portion 126 of BOAS segment 122. In various embodiments, the distance between radially inward portion 124 and radially outward portion 126 of BOAS segment 122, and a radial height of shiplap flanges 180a, 180b is selected to allow for radial translation of BOAS segments 122. For example, with combined reference to FIGS. 3 and 4, the distance between radially inward surface 170a and radially outward surface 182a of shiplap flange 180a may be less than the distance between radially inward facing surface 144 of radially outward portion 126 and radially outward facing surface 142 of radially inward portion 124.

Figure 7:
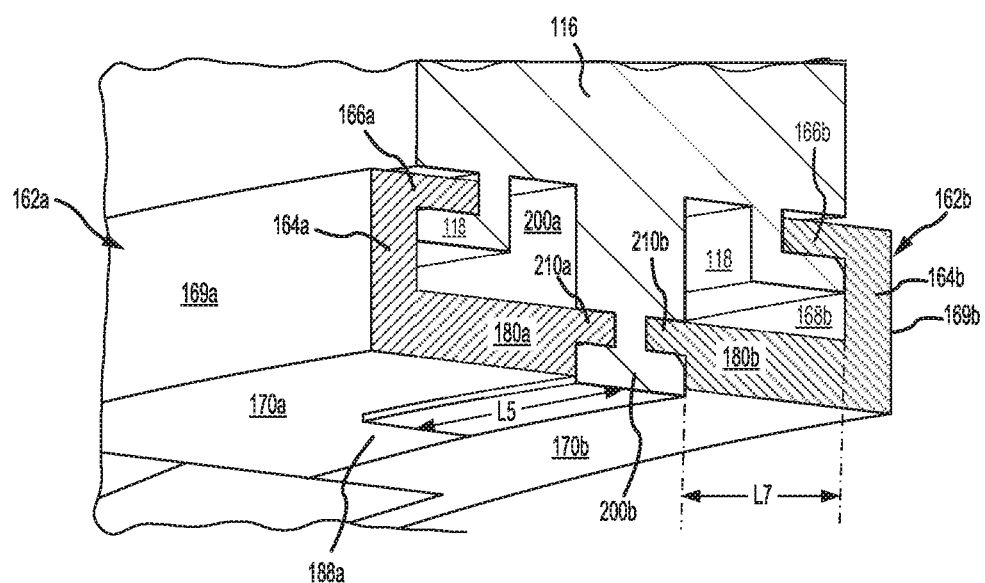
FIG. 7 illustrates a perspective view of a BOAS retention assembly coupled to an engine casing structure, in accordance with various embodiments.

FIG. 7, illustrates BOAS retention assembly 160 coupled to turbine case structure 116, with BOAS segment 122 removed for clarity. With combined reference to FIGS. 5A, 5B and FIG. 7, a circumferential length L5 of central flange 200 is approximately equal to circumferential distance D1 of ring orifice 194. It is contemplated and understood that circumferential length L5 of central flange 200 may be slightly less than circumneutral distance D1 to allow for thermal expansion of retention rings 162a, 162b and/or for thermal expansion of central flange 200. For example, the difference between circumneutral distance D1 and circumferential length L5 may be between 0.002 inches and 0.10 inches (0.051 mm and 2.54 mm), or between 0.002 inches and 0.02 inches (0.051 mm and 0.51 mm). In various embodiments, and with combined reference to FIGS. 3 and 5A, a circumferential length L4 of case orifice 152 may be equal to circumferential distance D1. In various embodiments, an axial width of case orifice 152 may be equal to axial width W1 of ring orifice 194.

Central flange 200 is located circumferentially between radially outward protrusions 186a, 186b and circumferentially between radially inward protrusions 188a, 188b. Circumferential translation of BOAS retention assembly 160 (i.e., circumferential translation of forward and aft retention rings 162a, 162b) may be limited by interferences generated between central flange 200 and radially outward protrusion 186a, 186b and radially inward protrusions 188a, 188b of shiplap flanges 180a, 180b. With reference to FIG. 6C, circumferential translation of BOAS segments 122 may be limited by interference generated between walls 128 (FIG. 3) of BOAS segment 122 and the shiplap flanges 180a, 180b located within retention ring channel 150 (i.e., between walls of 128 of BOAS segment 122 and first and second circumferential ends 190a, 190b, 192a, 192b of shiplap flanges 180a, 180b).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A retention ring for a blade outer air seal retention assembly, comprising:
   a radially extending wall;
   an axially extending rail located at an outer circumference of the radially extending wall; and
   a first shiplap flange extending axially from a surface of the radially extending wall, the first shiplap flange comprising:
      a first surface located a first axial length from the surface of the radially extending wall;
      a recessed surface located radially inward of the first surface, wherein the recessed surface is located a second axial length from the surface of the radially extending wall, the second axial length being less than the first axial length;
      a first protrusion located at a radially outward surface of the first shiplap flange, wherein the first protrusion is located at a first circumferential end of the first shiplap flange; and
      a second protrusion located at a radially inward surface of the first shiplap flange, the second protrusion being located at a second circumferential end of the first shiplap flange opposite the first circumferential end, wherein a circumferential distance between the first protrusion and the second protrusion is equal to a circumferential length of the recessed surface.

2. The retention ring claim 1, further comprising a plurality of circumferentially spaced shiplap flanges, the plurality of circumferentially spaced shiplap flanges including the first shiplap flange.

3. The retention ring of claim 2, wherein the radially extending wall extends continuously about a center axis of the retention ring.

4. A blade outer air seal retention assembly, comprising
   a forward retention ring comprising:
      a first wall, and
      a first shiplap flange extending aft from a first surface of the first wall, wherein the first shiplap flange comprises a first radially outward protrusion and a first radially inward protrusion; and
   an aft retention ring coupled to the forward retention ring, the aft retention ring comprising:
      a second wall, and a second shiplap flange extending forward from a second surface of the second wall, wherein the second shiplap flange comprises a second radially outward protrusion and a second radially inward protrusion, and wherein the first radially outward protrusion of the first shiplap flange engages the second radially inward protrusion of the second shiplap flange, and wherein the first radially inward protrusion of the first shiplap flange engages the second radially outward protrusion of the second shiplap flange.

5. The blade outer air seal retention assembly of claim 4, wherein the first shiplap flange and the second shiplap flange define a ring orifice.

6. The blade outer air seal retention assembly of claim 5, wherein a first axial width of the ring orifice is greater than a second axial width of the ring orifice, the first axial width extending from a first recessed surface of the first shiplap flange to a second recessed surface of the second shiplap flange, the second axial width extending from an aft-facing first surface of the first shiplap flange to a forward-facing first surface of the second shiplap flange.

7. A turbine section of a gas turbine engine, comprising:
a blade outer air seal comprising a first blade outer air seal segment; and
a blade outer air seal retention assembly coupled to the blade outer air seal, the blade outer air seal retention assembly comprising:
a forward retention ring including a first shiplap flange extending aft from a radially extending wall of the forward retention ring, and
an aft retention ring coupled to the forward retention ring, the aft retention ring including a second shiplap flange extending forward from a radially extending wall of the aft retention ring, wherein the first shiplap flange and the second shiplap flange are located in a retention ring channel defined by the first blade outer air seal segment.

8. The turbine section of claim 7, wherein the blade outer air seal comprises a plurality of blade outer air seal segments arranged in circumferential series around an engine central longitudinal axis, the plurality of blade outer air seal segments including the first blade outer air seal segment, and wherein the forward retention ring comprises a plurality of forward ring shiplap flanges extending aft from the radially extending wall of the forward retention ring, the plurality of forward ring shiplap flanges including the first shiplap flange, and wherein at least one forward ring shiplap flange of the plurality of forward ring shiplap flanges is located within each blade outer air seal segment of the plurality of blade outer air seal segments.

9. The turbine section of claim 7, further comprising a turbine case structure located radially outward of the blade outer air seal and the blade outer air seal retention assembly, wherein the blade outer air seal retention assembly couples the blade outer air seal to the turbine case structure.

10. The turbine section of claim 9, wherein the first blade outer air seal segment comprises a radially outward portion and a radially inward portion, and wherein the retention ring channel is defined by the radially outward portion and the radially inward portion of the first blade outer air seal segment.

11. The turbine section of claim 10, wherein the turbine case structure comprises a central flange, and wherein the central flange is located through a case orifice defined by the radially outward portion of the first blade outer air seal segment.

12. The turbine section of claim 11, wherein the first shiplap flange and the second shiplap flange define a ring orifice, and wherein the central flange is located in the ring orifice.

13. The turbine section of claim 12, wherein the central flange defines a groove, and wherein a first portion of the first shiplap flange and a second portion of the second shiplap flange are located in the groove.

14. The turbine section of claim 12, wherein the first shiplap flange comprises a first radially outward protrusion and a first radially inward protrusion, and wherein the second shiplap flange comprises a second radially outward protrusion and a second radially inward protrusion, and wherein the first radially outward protrusion of the first shiplap flange engages the second radially inward protrusion of the second shiplap flange, and wherein the first radially inward protrusion of the first shiplap flange engages the second radially outward protrusion of the second shiplap flange.

15. The turbine section of claim 14, wherein the central flange is located circumferentially between the first radially outward protrusion and the second radially outward protrusion and circumferentially between the first radially inward protrusion and the second radially inward protrusion.

* * * * *